July 21, 1964   C. A. NIEUWENHUIS ETAL   3,141,915
METHOD AND DEVICE FOR MAKING WAX PATTERNS
Filed Nov. 10, 1959
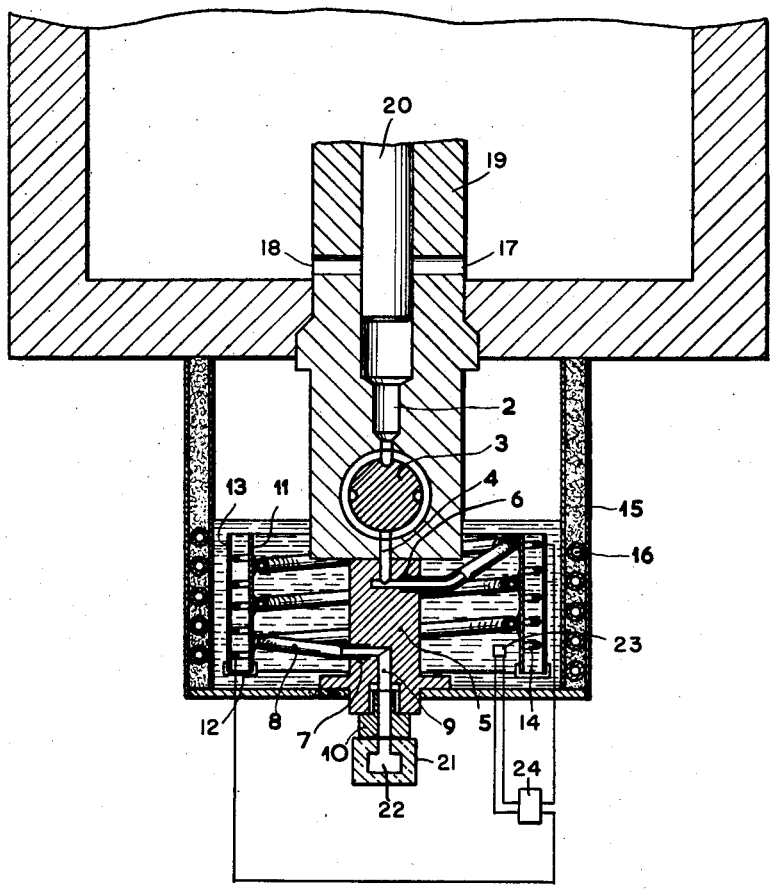
INVENTOR
C. A. NIEUWENHUIS
D. G. VOGTSCHMIDT
BY Frank R. Trifari
AGENT

3,141,915
METHOD AND DEVICE FOR MAKING WAX PATTERNS

Casparus Antonius Nieuwenhuis and Diederich Gerhard Vogtschmidt, Eindhoven, Netherlands, assignors to North American Philips Company, Inc., New York, N.Y., a corporation of Delaware
Filed Nov. 10, 1959, Ser. No. 852,123
Claims priority, application Netherlands Dec. 4, 1958
3 Claims. (Cl. 264—330)

The present invention relates to methods and devices for making wax patterns for use in precision-casting with lost wax pattern, in which wax is forced into moulds, the invention further relating to wax patterns made by these methods.

It is known to melt the wax, which is used in making lost wax patterns, in a container, the temperature of which is maintained constant by means of heating elements.

In order to avoid local overheating, such containers are sometimes heated indirectly, for example through a liquid-bath, circulation of the liquid or of the material to be melted ensuring a uniform temperature.

It has now proved advantageous to force the wax in a slightly plastic state, consequently not completely molten, into the moulds. This yields wax patterns having a higher accuracy to size. However, even minor temperature fluctuations involve considerable viscosity variations of the plastic wax. Hence, the temperature of the wax should be maintained constant within very narrow limits.

The present invention has for its object to provide a method permitting this condition to be fulfilled.

In accordance with the invention, the wax to be forced into the moulds is brought into the plastic state by cooling molten wax against a cooling liquid, the temperature of which is controlled by supplying heat.

In a device for carrying out the method according to the invention, provision is made of a pressure container for storing molten wax, which container is adapted to be heated in known manner.

According to the invention, the outlet of this container is connected with a heat exchanger consisting of a pipe conduit leading to a nozzle and mounted in a liquid-container to be cooled, which container also comprises a device for the controllable supply of heat to the liquid.

It has been found that the supply of heat is controllable more simply and accurately than does the extracting of heat. By cooling, the extraction of heat is maintained substantially constant, while the supply of heat has to be increased, so that the regulating mechanism responds more easily.

In one form of the device according to the invention, the conduit of the heat exchanger is a helical, for example copper tube, the ends of which are connected to joints, one of which is connected to the container for molten wax, while the other is connected to the nozzle.

The liquid container to be cooled preferably contains a helical heating element.

In order that the invention may be readily carried into effect, an example of a device for carrying out the method according to the invention will now be described in detail with reference to the accompanying drawing, in which Molten wax in container 1 is withdrawn through radial apertures 17 and 18 in a central cylinder 19, in which a plunger 20 can be reciprocated and which forces the wax through a helical tube 8 through an outlet 2 adapted to be connected through a cock 3 with a conduit 4 to a distribution manifold 5. The ends 6 and 7 of a heat-conductive, helical tube 8 are secured to the manifold 5.

A conduit 9 in the manifold 5 leads to a nozzle 10 adapted to co-act with a mould 21 having a cavity 22 into which wax is forced under pressure.

The tube 8 is secured to a jacket 11 which is connected through a strap 12 to a preferably perforated envelope 13 accommodating a helical heating element 14. The parts 5, 8 to 14 are installed in a container 15 which is filled, to the level shown in the drawing, with a liquid, for example oil, capable of withstanding continuous heating.

The outer wall of the container 15 contains a helical tube 16, for example consisting of copper, through which water flows so that the oil inside the container is cooled continuously.

The temperature of the oil is kept constant within very narrow limits by the controllable supply of heat to the oil through the heating element 14. This control may be effected electronically by means of a suitable circuit arrangement.

The heating element 14 is disposed so as to ensure a smooth circulation in the oil bath by thermosiphon-action.

What is claimed is:
1. A method of making a wax pattern for use in precision-casting with a lost wax pattern comprising the steps, bringing molten wax into heat-conducting relationship with a liquid cooling medium, withdrawing heat from the cooling medium to thereby cool the wax and bring it into a plastic state, heating the so-cooled cooling medium to a predetermined temperature range below that of the molten wax and forcing the wax in the plastic state into a mold.

2. Apparatus for supplying wax in a plastic state to a mold comprising a container for storing molten wax, means to withdraw the molten wax from the container and supplying wax in a plastic state to the mold including a helical tube connected at both ends to a manifold, one end of said manifold being connected to an outlet of said container and the other end of said manifold being connected to a nozzle for supplying plastic wax to the mold, a supply of a liquid cooling medium surrounding said conduit, means to withdraw heat from said cooling medium, means to heat said cooling medium to a predetermined temperature below that of the molten wax to thereby cool the same into a plastic state, and means responsive to the temperature of the cooling medium to maintain the temperature thereof at said predetermined temperature.

3. Apparatus as claimed in claim 2 in which the means for maintaining the temperature of the cooling medium at said predetermined temperature includes a container in said cooling medium which houses a helical heating element.

References Cited in the file of this patent
UNITED STATES PATENTS

| | | |
|---|---|---|
| 1,294,545 | Secord | Feb. 18, 1919 |
| 2,035,117 | English | Mar. 24, 1936 |
| 2,485,798 | Whyte et al. | Oct. 25, 1949 |
| 2,579,596 | Mintzer et al. | Dec. 25, 1951 |
| 2,709,278 | Greer | May 31, 1955 |
| 2,961,705 | Wacker | Nov. 29, 1960 |

UNITED STATES PATENT OFFICE
CERTIFICATE OF CORRECTION

Patent No. 3,141,915                               July 21, 1964

Casparus Antonius Nieuwenhuis et al.

It is hereby certified that error appears in the above numbered patent requiring correction and that the said Letters Patent should read as corrected below.

Column 2, lines 22 and 23, for "effected electronically by means of a suitable circuit arrangement" read -- effected, for example, electronically by means of a thermostat 23 connected by a suitable circuit arrangement to a power supply 24 for the heating element 14 --; line 45, for "conduit" read -- tube --.

Signed and sealed this 8th day of December 1964.

(SEAL)
Attest:

ERNEST W. SWIDER                               EDWARD J. BRENNER
Attesting Officer                                   Commissioner of Patents